(12) United States Patent
Lindgren et al.

(10) Patent No.: US 12,120,169 B2
(45) Date of Patent: Oct. 15, 2024

(54) EDGE NODE CONTROL

(71) Applicant: Net Insight AB, Solna (SE)

(72) Inventors: Per Lindgren, Strangnas (SE); Christer Bohm, Nacka (SE)

(73) Assignee: Net Insight AB, Solna (SE)

( * ) Notice: Subject to any disclaimer, the term of this patent is extended or adjusted under 35 U.S.C. 154(b) by 0 days.

(21) Appl. No.: 16/079,347

(22) PCT Filed: Feb. 24, 2017

(86) PCT No.: PCT/EP2017/054290
§ 371 (c)(1),
(2) Date: Aug. 23, 2018

(87) PCT Pub. No.: WO2017/144645
PCT Pub. Date: Aug. 31, 2017

(65) Prior Publication Data
US 2019/0058747 A1  Feb. 21, 2019

(30) Foreign Application Priority Data

Feb. 26, 2016 (SE) .................................... 1650254-4

(51) Int. Cl.
*H04L 65/75* (2022.01)
*H04L 65/80* (2022.01)
(Continued)

(52) U.S. Cl.
CPC ............ *H04L 65/765* (2022.05); *H04L 65/80* (2013.01); *H04N 21/2187* (2013.01);
(Continued)

(58) Field of Classification Search
CPC ..... H04L 65/605; H04L 65/80; H04L 65/765; H04N 21/2187; H04N 21/6375; H04N 21/64322
See application file for complete search history.

(56) References Cited

U.S. PATENT DOCUMENTS 6,577,599 B1 * 6/2003 Gupta ................. H04L 12/1868
                                                           370/236
7,502,818 B2   3/2009 Kohno et al.
(Continued)

FOREIGN PATENT DOCUMENTS

EP       1202487 A2      5/2002
EP       1557061 A1      7/2005
WO   WO-2004040928 A1 *  5/2004   ........... H04L 65/103

OTHER PUBLICATIONS

"Understanding IEEE 802.3ad Link Aggregation," 2014 (Year: 2014).*
(Continued)

*Primary Examiner* — Andrew C Georgandellis
(74) *Attorney, Agent, or Firm* — Harness, Dickey & Pierce, P.L.C.

(57) ABSTRACT

There is provided a method for providing edge node (110) fault management and bandwidth, (BW), control for transmission of a data stream in a packet-based network. The method comprises adaptively transmitting a data stream (DS) by controlling an outgoing data stream being transmitted to one or more client devices (151, 152, 153) by analyzing at least one data stream characteristics of a corresponding received data stream (DS1, DS2, DS3) of the one or more receiving client devices (151, 152, 153), and providing a transmission strategy for the outgoing data stream based on said analyzed data stream characteristics. Thereby accurate adjustment of consumed (BW) and an associated recovery scheme, i.e. FEC and/or retransmission, to maintain highest achievable performance when it comes to video quality and also affect on other services, are provided.

4 Claims, 3 Drawing Sheets

(51) Int. Cl.

| | |
|---|---|
| *H04N 21/2187* | (2011.01) |
| *H04N 21/2343* | (2011.01) |
| *H04N 21/238* | (2011.01) |
| *H04N 21/2383* | (2011.01) |
| *H04N 21/24* | (2011.01) |
| *H04N 21/258* | (2011.01) |
| *H04N 21/442* | (2011.01) |
| *H04N 21/6375* | (2011.01) |
| *H04N 21/643* | (2011.01) |
| *H04W 4/18* | (2009.01) |

(52) U.S. Cl.
CPC ....... *H04N 21/2343* (2013.01); *H04N 21/238* (2013.01); *H04N 21/2383* (2013.01); *H04N 21/2402* (2013.01); *H04N 21/25808* (2013.01); *H04N 21/44209* (2013.01); *H04N 21/6375* (2013.01); *H04N 21/64322* (2013.01); *H04W 4/18* (2013.01)

(56) References Cited

U.S. PATENT DOCUMENTS

| | | | | |
|---|---|---|---|---|
| 9,197,559 | B1* | 11/2015 | Cloonan | H04L 12/6418 |
| 10,305,955 | B1* | 5/2019 | Li | H04L 65/762 |
| 2005/0232148 | A1* | 10/2005 | Curcio | H04W 76/12 |
| | | | | 370/230 |
| 2007/0276954 | A1 | 11/2007 | Chan et al. | |
| 2008/0008167 | A1* | 1/2008 | Ver Steeg | H04L 1/1819 |
| | | | | 370/389 |
| 2010/0202453 | A1* | 8/2010 | Martinez Bauza | |
| | | | | H04N 21/6405 |
| | | | | 370/390 |
| 2013/0115989 | A1* | 5/2013 | Yamazaki | H04W 88/00 |
| | | | | 455/507 |
| 2014/0269401 | A1 | 9/2014 | Gondi et al. | |
| 2015/0281306 | A1* | 10/2015 | Barak | H04N 21/6582 |
| | | | | 725/93 |
| 2018/0310056 | A1* | 10/2018 | Matute Arribas | H04L 67/22 |

OTHER PUBLICATIONS

International Search Report PCT/ISA/210 for International Application No. PCT/EP2017/054290 Dated Apr. 28, 2017.

Written Opinion of the International Searching Authority PCT/ISA/237 for International Application No. PCT/EP2017/054290 dated Apr. 28, 2017.

\* cited by examiner

EDGE NODE CONTROL

CROSS-REFERENCE TO RELATED APPLICATIONS

This application is a national phase under 35 U.S.C. § 371 of PCT International Application No. PCT/EP2017/054290 which has an International filing date of Feb. 24, 2017, which claims priority to Sweden Application No. 1650254-4, filed Feb. 26, 2016, the entire contents of each of which are hereby incorporated by reference.

FIELD OF THE INVENTION

The present invention relates to broadcasting and media distribution over IP (Internet Protocol) networks, and more particularly to edge node fault management and bandwidth (BW) control for transmission of a data stream in a packet-based network.

BACKGROUND OF THE INVENTION

Video distribution for live TV over a packet-network, like the Internet, has some challenges. In today's solution, the normal mechanisms for transferring data files is the so called TCP transmission control protocol. This protocol ensures that lost data is retransmitted and if substantial amount of data is lost, the sender sends less data to avoid congestion in the network. This means that it is not possible to ensure when data arrives and it uses a "fits all" strategy for retransmission. For TV the non predictable arrival is compensated with extensive buffering at the receiver side, which "removes" the live experience of the TV. Delays can be several minutes.

In media distribution over an IP network, such as video and TV distribution over the Internet, the bandwidth to a client device might vary depending on different circumstances. Today, variation in bandwidth as conceived by the client device is typically handled by three mechanisms: congestion control mechanisms of TCP (Transmission Control Protocol of the TCP/IP protocol stack), buffering, and adjusting the video quality (ABR). Basically, congestion control is handled by the TCP protocol stack which adjusts the retransmission rate of lost packets to adapt the client device to use a fair share of the available bandwidth in the network (or actually in the bottleneck of the transmission). In such system, the client device needs to buffer data because it is not certain that the network can offer the bandwidth required by the video stream, and for video the client device needs to have video data to present to maintain viewer experience. So buffering is needed to absorb variances in bitrate introduced by the network and specifically by the TCP congestion avoidance mechanisms and the jitter introduced by the network. As the capacity and jitter varies in the IP network, the receiving client device pause the presentation of a current video on the screen to accumulate more video data in its buffer. The accumulation is one way, meaning that the delay will increase and never decrease for a specific session. Such adjustments introduce delay and the video cannot be considered as live distribution.

UDP (user datagram protocol) is an alternative to TCP that sends datagrams over an IP network. To escape the limitation of TCP in maintaining the bitrate in case of variations in quality by using congestion control mechanisms, an alternative is to use UDP and retransmission of data without congestion control. As media streams can accept small data losses but not long delays in the transport, and while TCP is not concerned with delay but needs all data to arrive at the destination, an alternative solution for media streaming is to use UDP with a retransmission technique adapted to the difference in requirements of media streams as compared with data transport. Such a retransmission technique helps the video streams to be transferred through the network while not backing off in the case of congestion. Because of that, there is a need for retransmission strategies where care is taken to avoid that other traffic on the network suffers while at the same time protecting the video streams. For example, in a typical situation the receiver detects a lot of lost packets and requests retransmission of the lost packets, and when the actual BW available for the receiver has decreases because of more devices sharing the same bandwidth, bad connectivity to base station or hotspot or network congestions occur. The requests for retransmission of lost packets together with the video stream will temporarily consume more capacity than available and therefore worsen the situation. In view of the above, there is thus a need for mechanisms to handle retransmissions within media distribution over an IP network in an intelligent way.

For Live TV distribution there are existing alternative methods to solve this by using a retransmission technology where there is a maximum acceptable delay. If that delay is exceeded, the data is accepted as lost. This means that there is a bounded delay of the transport.

Another common method is to reduce the BW of the stream and send a video stream with higher compression meaning lower BW (ABR).

In Live TV distribution, the distribution is done by transporting video from sender to device with a BW of the video stream, which is selected (changed) based on the ability of the device to receive the content. For example, if a mobile device moves from one area where is has 4G to another that has 3G, the BW is reduced and therefore the BW of the video needs to be changed. Also, going from 3G to 4G a higher BW of the video stream can be selected.

To handle the shifts in BW of the video stream without (or with minimum) interruptions is a challenge. It can also be the available BW to the device that changes over time. For example, more subscribers enter the same mobile cell and the BW is divided by more users or the Wi-Fi changes the access speed because of weak signal.

Systems known today typically accept frozen pictures and/or delayed playing of the content. There are some advanced systems using forward error correction (FEC) adding redundant information to the stream to make it more resilient to loss of data. This is however not good since in a situation where the BW decreases, the sender sends more information which also potentially is redundant.

SUMMARY OF THE INVENTION

It would be advantageous to at least provide an improved and reliable method of transmission of data streams which prevents congestion in the network and which is suitable for live distribution of media content, such as TV/video/audio streams, in an IP network like the Internet. This object is achieved by a method according to the present invention as defined in claim 1.

There is provided a method of adaptively transmitting a data stream comprising for at least one outgoing data stream being transmitted to at least one client device analyzing at least one data stream characteristics of a corresponding received data stream of the at least one client device, and providing a transmission strategy for the outgoing data stream based on the analyzed data stream characteristics.

This is advantageous to provide accurate adjustment of the consumed BW and associated recovery scheme, i.e. FEC and/or retransmission, to maintain highest achievable performance when it comes to video quality and also affect on other services. The step of analyzing of the received data stream is according to an embodiment based on retrieved information associated with the received data stream from the client device, which information can be implicit e.g. packet loss patterns, or explicit e.g. measuring the bitrate. The analysis may be performed continuously, or with predetermined intervals.

According to an embodiment of the method, the transmission strategy is further based on at least one system characteristics. The system characteristics is according to an embodiment of the method one of access technology type (e.g. fibre or wireless access), the client device capability (e.g. if the device supports 3G, 4G or 5G).

According to an embodiment of the method, the transmission strategy is provided by selecting a control scheme from a set of predetermined control schemes. The selection of control scheme is according to an embodiment based on the type of access technology to the device, e.g., 3G, 4G, WiFi, CATV or FTTH.

According to an embodiment of the method, the step of analyzing is performed for a plurality of outgoing data streams associated with a plurality of nodes or a group(s) of client devices.

According to an embodiment of the method, the method further comprises providing a coordinated or a common transmission strategy for the plurality of nodes or the group of client devices. Advantageously, the transmission strategy can be selected differently for subareas of a network experiencing different network performance. The benefit of coordinating the strategies for ABR, FEC and retransmissions between several devices is that quality and performance can be optimized between the client devices sharing the resources.

The problem lies in when a congested state starts to occur in a part of a network. This will cause many clients to lose packets and, using retransmission recovery mechanisms, start resending of packets thereby causing even more data to be sent into the network causing further congestion. This can create so called avalanche effects. In TCP, this is handled conservatively by the use of so called back-off effects. However, for live streaming of video, this causes delays and is therefore not optimal. The other alternative is to use UDP with retransmission and then revert to go down in ABR rates. However, if clients independently make such decisions as is the normal case, oscillation effects may occur. However, by monitoring the packet loss characteristics of all or a subset of clients in a part of the network, a more intelligent decision can be taken to reduce the ABR rate for multiple devices simultaneously before a severe congestion occurs and thereby avoiding avalanche effects and large oscillations in the network.

According to an embodiment of the method, the method further comprises grouping client devices. The grouping of client devices may be based on identifying which client devices are utilizing one or more common network resources, such as e.g. a common base station, or an aggregation network. Grouping of clients is according to an embodiment dynamically performed, e.g. to cover mobile devices switching from a first base station to another.

According to an embodiment of the method, the method further comprises identifying if a single client device is utilizing a specific base station/network resource, which is advantageous for selecting an optimum transmission strategy (or control scheme) for each device in the group.

According to an embodiment of the method, the group of client devices is connected to an aggregation network, which is a bottle neck, e.g. when the access technology is Fiber To The Home (FTTH) with access capacities of Gigabits. In this case the aggregation network cannot handle the sum of all access capacity and under stressed situations it can be necessary to control the BW usage of the clients.

According to an embodiment of the method, the grouping of clients is determined by which edge (egress) streaming server they are served from in a CDN (Content Delivery Network) context.

With the present inventive concept, a coordinated transmission strategy and thereby a coordinated control of the BW usage of the clients of a group, clients within a specific subarea, or group connected to an aggregation network is provided which advantageously optimizes the overall performance of the network.

According to an embodiment of the method, the predetermined data stream characteristics are at least one of packet loss patterns, and change in delays, of the received data stream. Analysis of data stream characteristics may thus be performed on e.g. packet loss patterns in the received data stream by determining the existence of short bursts of loss, or long bursts of loss. For example, if the loss pattern is more sporadic it is probably a result of randomly lost packets in a radio access and there is no need to reduce retransmissions. If there are longer bursts of packet loss, the system is more likely overloaded and there is beneficial to reduce the ABR level and/or reduce the BW consumed by FEC and retransmissions.

According to an embodiment of the method, the method further comprises determining the system characteristics.

According to an embodiment of the method or system in which the method is employed, a centralized monitoring unit is monitoring the packet loss characteristics of all devices belonging to a group of clients.

According to an embodiment of the method, the system characteristic is one of access technology type, network type, and device capability.

According to an embodiment of the method, the transmission strategy comprises applying at least one of retransmission, FEC and ABR.

According to an aspect of the invention, there is provided a node in a communication network comprising means for performing a method according to the inventive concept.

According to an embodiment of the node, the node comprises means for transmitting the outgoing data stream (e.g. a transmitter).

According to an embodiment of the method, central control of a group of devices is done for the individual devices of the group based on priority. The priority can be based on the type of subscription the client device has or based on the type of content it is currently is receiving.

Embodiments of the present inventive method are preferably implemented in a distribution, media content provider, or communication system by means of software modules for signalling and providing data transport in form of software, a Field-Programmable Gate Array (FPGA), an Application Specific Integrated Circuit (ASIC) or other suitable device or programmable unit, adapted to perform the method of the present invention, an implementation in a cloud service or virtualized machine (not shown in diagrams). The software module and/or data-transport module may be integrated in a node comprising suitable processing means and memory means, or may be implemented in an external device comprising suitable processing means and memory means, and which is arranged for interconnection with an existing node. The node is preferably arranged at an edge node, e.g. in communication with a streaming edge server, or is integrated in/or constitutes a streaming edge server.

Further objectives of, features of, and advantages with, the present invention will become apparent when studying the following detailed disclosure, the drawings and the appended claims. Those skilled in the art realize that different features of the present invention can be combined to create embodiments other than those described in the following.

DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

Figure 1:
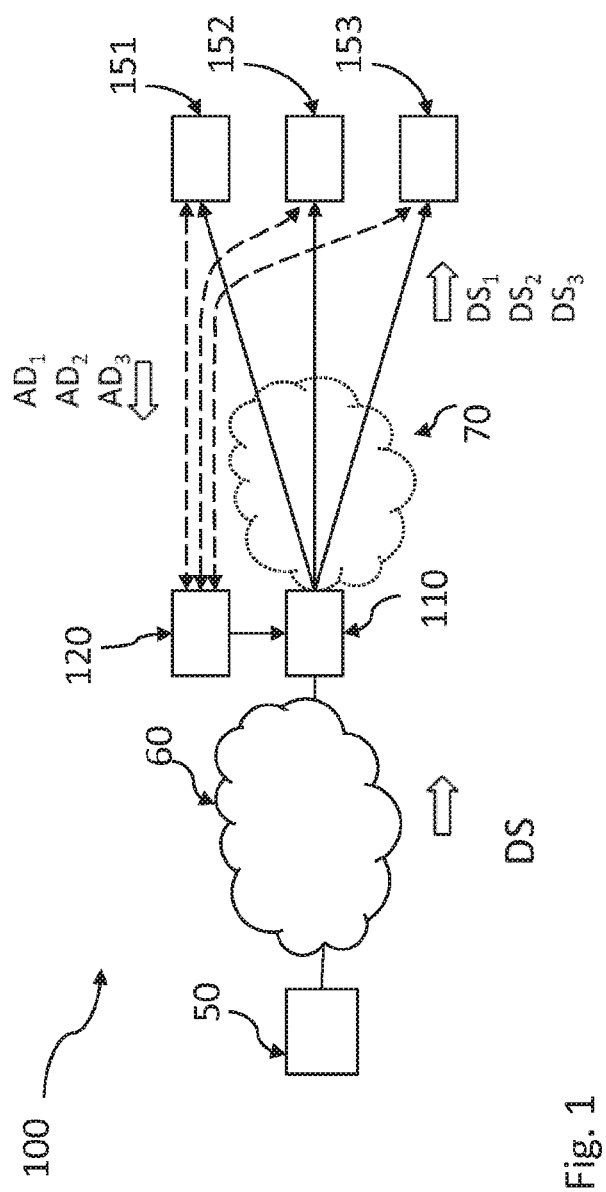
FIG. 1 is a schematic block diagram illustrating a distribution system in which embodiments according to the present inventive concept may be employed.

Referring now to FIG. 1, which is a block diagram schematically illustrating a distribution network system 100 of IP type for live distribution of e.g. video, in view of which aspects of the inventive concept will be described. An ingress device 50 of the distribution system 100, e.g. a server (a source), is arranged for providing media content to one or more recipients or client devices 151, 152, 153. The media content is sent as a data stream DS using unicast or multicast via respective communication links over a primary network 60, and is typically provided as a stream of contiguous packets, which may have different size, and may represent different types of packets with some header or trailer portion identifying the type.

In the distribution network system 100 data transmission of the data stream DS from the ingress device 50 to the client devices 151, 152, 153 may involve transmitting e.g. video content or other media content in the form of video packets (multi cast video packets), and e.g. audio packets. The data stream DS is received at a streaming edge server (playout server), here embodied by a central master node 110, from which the multiple client devices 151, 152, 153 located at different viewer locations request media content to display. The media content is distributed to the client devices 151, 152, 153 in separate data streams $DS_1$, $DS_2$, and $DS_3$ over a respective communication link, which may be provided over a computer network (e.g. a LAN a WAN, the Internet), a wireless network (e.g. a cellular data network), or some combination of these network types (illustrated as a secondary network 70 in FIG. 1). Each client device 151, 152, 153 comprises means for processing received media content and to select media content to play. The primary distribution network 50 and the secondary network 60 do not need to be dedicated networks but can be shared with other services.

In order to handle missing packets and other types of errors, communication and distribution systems employ various techniques to handle erroneously received information. The client devices may correct the erroneously received information amongst other techniques by retransmission techniques, which enable the erroneously received information to be retransmitted to the receiver, for example, by using automatic retransmission request (ARQ) or forward error correction (FEC) techniques. FEC techniques include, for example, convolutional or block coding of the data prior to modulation. FEC coding involves representing a certain number of data bits or blocks of data using a certain (greater) number of code bits or code blocks, thereby adding redundancy which permits correction of certain errors.

According to an embodiment of the invention the distribution system further comprises a control device, which here is embodied by a control server 120, arranged in communication with the master node 110 and the client devices 151, 152, 153.

The control server 120 is arranged to detect or receive analyzer data $AD_1$, $AD_2$, $AD_3$, e.g. data stream characteristics like frequency and pattern of retransmission requests, bitrate measurements, and/or system characteristics current base station the device is connected to, signal strength, and/or client device characteristics etc. from the client devices 151, 152, 153 and to perform analysis on the received analyzer data. Based on the information from this analysis, the control server 120 determines per device which algorithm shall be used to control ABR, retransmission, FEC, etc. The decision is according to an embodiment done on a group of devices but imposing algorithm, i.e. the transmission strategy of the group, is (typically) done per device. The transmission strategy may be partly applied in the master node 110, e.g. when each client device decides what data to request retransmission on, based on the transmission strategy that the control server distributes to the client devices 151, 152, 153/master node 110, while the control server 120 may instruct the master node to provide the lowest possible ABR level on a group of client devices comprising the client devices 151, 152, 153.

The analyzer data analysis may detect e.g.

Shorter bursts of loss in the received data stream, which indicates temporary congestions in the secondary network (operation of the secondary data network data transmission is interrupted at intervals) which can be cured with retransmissions.

A longer burst, which for example can indicate that the device has entered a lower BW and the resulting action for the transmission strategy is to change to a lower BW video stream (ABR adjustment).

Shorter bursts of loss at the lowest video BW, which should result in another strategy than retransmissions, because an increased retransmission could increase used BW of the secondary network, when in fact it needs to be reduced. A preferable resulting transmission strategy action is to change the retransmission strategy to be less aggressive and also to accept a growing buffer by repeating video frames or slowing the play out clock slightly (if possible). This will remove the live experience temporarily. It is possible to return to live when the conditions in the secondary network gets better. According to an embodiment, a choice between returning to live (with a loss of video) or continuing with a delay, is comprised in the transmission strategy.

A sharp increase in retransmission requests indicates that the video BW shall be decreased. The transmission strategy preferably includes that in the intermediate time of changing video BW, a selective approach of retransmission shall be used to avoid an explosion of traffic at the same time as the BW of the network is decreased. Selective retransmission may include for example to only send audio and I-frames and not sending the complete video stream, which will handle the worsened situation in a controlled way.

Another way to input to the strategy for the algorithm of ABR and retransmission is to get the type of network the device is connected to (fibre, WIFI, 4G, etc). Knowing the access type, the strategy can be optimized. If there is for example fibre loss in a fibre net, the reason is most probably congestion in the metro network meaning that no back off is needed, while if there is loss in a 4G network a more conservative strategy is needed not to saturate the network with unnecessary traffic.

The analyzer data is according to an exemplifying embodiment selected to include data stream characteristics according to Table 1. Table 1 further contains the access characteristics, network characteristics, indications associated with a data stream and/or access and/or network characteristics, and suitable transmission strategy actions associated with the different combinations of (data stream-, network-, client device-) characteristics (OR associated with indications).

TABLE 1

| Data Stream or Access Characteristics | Network Characteristics | Indication | Transmission Strategy Action |
|---|---|---|---|
| Short bursts of loss | | Temporary congestions | Normal Retransmission |
| Longer bursts of loss | | BW decrease | ABR and if problem continues selective retransmission |
| Sharp increase in retransmission requests | | Need to lower video BW | ABR with intermediate selective retransmission |
| | Access type | | Adapt for access type |
| Weak WiFi/3G/4G signal | | Need to lower video BW | ABR with selective retransmission |

Figure 2:
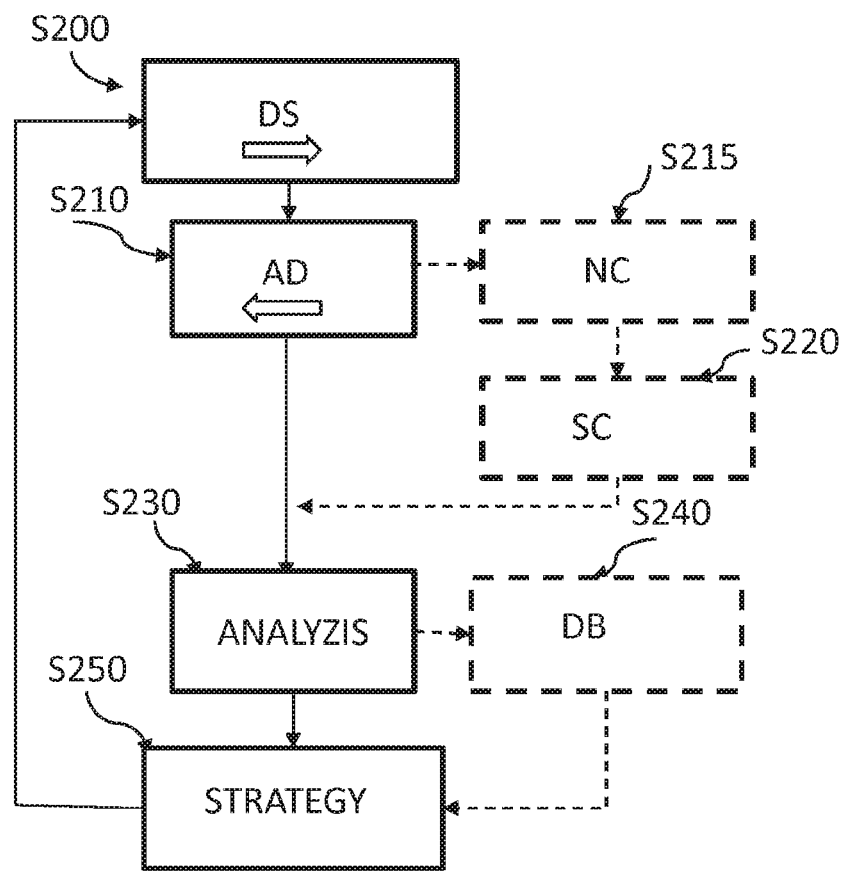
FIG. 2 is a flowchart illustrating an embodiment of a method according to the present inventive concept.

Continuing now with reference to FIG. 2, which is a flowchart illustrating steps in an embodiment of a method according to the present inventive concept for providing a transmission strategy for transmission of a data stream in a packet-based network in an adaptive manner. The data stream for transmission DS is represented as a sequence of data packets representing a contiguous stream of information, with each data packet comprising a set of payload information representative of a segment of the stream of information corresponding thereto. Initially the data stream is transmitted over respective communication links to client devices or nodes in a distribution network (step S200). As instances of the data stream is received at the different client devices, the received data streams DS1, DS2, DS3 are monitored and analyzer data AD ($AD_1$, $AD_2$, $AD_3$ in FIG. 1) corresponding to predetermined data stream characteristics like delay, request data etc. becomes available (step S210). The analyzer data is then analyzed (step S230) as described above. Based on the analysis a transmission strategy is provided (step S250) and applied to the continued transmission of the data stream (step S200). The analysis of the analyzer data is thus typically performed on a multiple of client devices, however if only one device is present, analysis of a single device is applicable.

Figure 3:
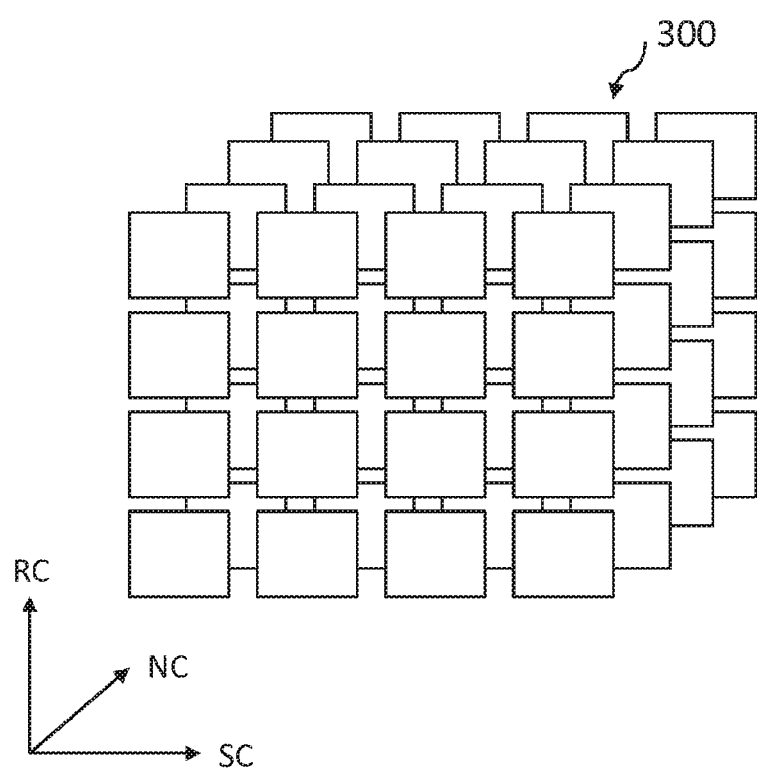
FIG. 3 is a schematic illustration of predetermined control schemes according to an embodiment of the present inventive concept.

The result/conclusion from the analysis of the analyzer data (step S230) is utilized to select a suitable transmission strategy (a control scheme) for the outgoing data stream DS, which is adapted to the current network conditions, system characteristics and receiving clients. The transmission strategy is according to an embodiment of the method selected from a set of predetermined control schemes (step S240) (optional). The predetermined control schemes are preferably provided based on different possible combinations of current network conditions (network characteristics/data stream characteristics) (NC), system characteristics (AC) and capabilities of the receiving clients (RC), see a schematic illustration in FIG. 3 in which a predetermined set of possible control schemes 300 are selectable depending on different network conditions NC, capability of the receiving client (RC) and system characteristics (SC). In an alternative embodiment, the transmission strategy is provided by means of a simulation software.

The analyzer data may be retrieved from a plurality of outgoing data streams associated with a plurality of nodes or a group of client devices. A coordinated, or alternatively a common, transmission strategy for the plurality of nodes or the group of client devices. One example of a coordinated strategy can be that the control device discovers that there is a number of devices connected to the same mobile base station. One of the devices starts reporting many dropped packets but have good signal indicating that the shared capacity is exhausted. One example of a strategy is that the control device forces a lower ABR level and/or instructs the devices to only request retransmission on critical data such as audio and full images.

According to an embodiment, when the transmission strategy is further based on at least one of network characteristics and client device characteristics, an optional step of determining system characteristics of the network (step S215) is applied after receiving, or optionally in parallel with receiving analyzer data. The step of analysing (step S230) then comprises analysing the network characteristics and/or the client devices. This step of determining the system characteristics and client devices (S215) comprises one or more of identifying groups of client devices utilizing a common network resource, identifying if a single client device is utilizing a specific base station/network resource, identifying if a group of client devices are connected to an aggregation network. Groups of clients are most easily constructed by identifying devices connected to the same base station or WiFi router (e.g. by requesting/receiving base station IDs from each client device).

According to an embodiment of the method, when the transmission strategy is further based on at least one system characteristics, an optional step of determining system characteristics of the network (step S220) is applied after receiving/in parallel with receiving analyzer data. As previously mentioned, the system characteristics can be one or more of access technology type, network type, and device capability and is performed by for example the device which knows what access technology it is connected to. It can also report its capabilities. Which aggregation network a group of devices are connected to can be determined by the IP addresses used by a group of devices.

Although illustrative embodiments of the present inventive concept have been described herein with reference to the accompanying drawing, it is to be understood that the invention is not limited to that precise embodiments thereof, but that various changes and modifications may be effected therein by one skilled in the art without department from the scope or spirit of this invention.

The invention claimed is:

1. A method, comprising:
   streaming, from a streaming edge server, a live video as a live video stream to each client device of a plurality of client devices;
   identifying a group of two or more client devices of the plurality of client devices that are connected to a common network resource, wherein the common network resource includes a common base station or aggregation network;
   receiving, by a control server that is in communication with the streaming edge server, analyzer data from each client device in the group indicating a number of times that each client device in the group has requested retransmission of a portion of the live video stream;
   determining, by the control server, that a rate at which a number of retransmission requests are collectively received from all of the two or more client devices in the group during the portion of the live video stream exceeds a threshold rate of retransmission requests;
   instructing, by the control server, each client device in the group to request retransmission of only audio and I-frames of the live video stream; and
   instructing, by the control server, the streaming edge server to reduce a highest selectable bitrate of the live video stream to each client device in the group.

2. The method according to claim 1, further comprising:
   instructing, by the control server, each client device in the group to accept a growing buffer based on either repeating video frames of the live video stream or slowing a playout clock of the client device in an intermediate time of reducing the highest selectable bitrate of the live video stream.

3. A communication network, the communication network comprising:
   a streaming edge server and a control server that is in communication with the streaming edge server, the streaming edge server and the control server each including a respective at least one memory that stores respective computer-executable instructions and a respective at least one processor configured to access the respective at least one memory and execute the respective computer-executable instructions such that the streaming edge server and the control server cause the communication network to:
   stream, from the streaming edge server, a live video as a live video stream to each client device of a plurality of client devices;
   identify a group of two or more client devices of the plurality of client devices that are connected to a common network resource, wherein the common network resource includes a common base station or aggregation network;
   receive, by the control server that is in communication with the streaming edge server, analyzer data from each client device in the group indicating a number of times that each client device in the group has requested retransmission of a portion of the live video stream;
   determine, by the control server, that a rate at which a number of retransmission requests are collectively received from all of the two or more client devices in the group during the portion of the live video stream exceeds a threshold rate of retransmission requests;
   instruct, by the control server, each client device in the group to request retransmission of only audio and I-frames of the live video stream; and
   instruct, by the control server, the streaming edge server to reduce a highest selectable bitrate of the live video stream to each client device in the group.

4. The communication network according to claim 3, wherein the streaming edge server and the control server are further configured to cause the communication network to instruct, by the control server, each client device in the group to accept a growing buffer based on either repeating video frames of the live video stream or slowing a playout clock of the client device, is performed in an intermediate time of reducing the highest selectable bitrate of the live video stream.

* * * * *